(12) United States Patent
Swenson et al.

(10) Patent No.: US 11,338,943 B2
(45) Date of Patent: May 24, 2022

(54) CONCURRENT ROCKET ENGINE PRE-CONDITIONING AND TANK LOADING

(71) Applicant: The Boeing Company, Chicago, IL (US)

(72) Inventors: Kevin Swenson, Long Beach, CA (US); Henry Rodriguez, Jr., Diamond Bar, CA (US); Brian Vaniman, Fountain Valley, CA (US); Martin Edward Lozano, Whittier, CA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 16/153,435

(22) Filed: Oct. 5, 2018

(65) Prior Publication Data

US 2020/0108952 A1 Apr. 9, 2020

(51) Int. Cl.
| | |
|---|---|
| *B64G 1/40* | (2006.01) |
| *B64G 1/00* | (2006.01) |
| *F02K 9/56* | (2006.01) |
| *F02K 9/58* | (2006.01) |
| *F02K 9/60* | (2006.01) |
| *B64G 5/00* | (2006.01) |

(52) U.S. Cl.
CPC ............ *B64G 1/402* (2013.01); *B64G 1/002* (2013.01); *B64G 1/401* (2013.01); *B64G 5/00* (2013.01); *F02K 9/566* (2013.01); *F02K 9/58* (2013.01); *F02K 9/605* (2013.01); *F05D 2260/606* (2013.01); *F05D 2270/306* (2013.01)

(58) Field of Classification Search
CPC ........ B64G 1/401; B64G 1/402; B64G 1/002; B64G 5/00; F02K 9/44; F02K 9/566; F02K 9/58; F02K 9/605; F02K 9/64; F02K 9/50; F02K 9/972
See application file for complete search history.

(56) References Cited

U.S. PATENT DOCUMENTS

| | | | |
|---|---|---|---|
| 5,644,920 A * | 7/1997 | Lak | B64G 1/402 62/47.1 |
| 5,862,670 A | 1/1999 | Lak | |
| 6,101,808 A | 8/2000 | Knuth et al. | |
| 6,932,302 B2 * | 8/2005 | Martin | B64G 1/14 455/12.1 |

(Continued)

OTHER PUBLICATIONS

European Patent Office, "Extended Search Report," issued in connection with European Patent Application No. 19200424.0, dated Feb. 28, 2020, 9 pages.

(Continued)

*Primary Examiner* — Todd E Manahan
*Assistant Examiner* — Kyle Robert Thomas
(74) *Attorney, Agent, or Firm* — Hanley, Flight & Zimmerman, LLC (57) ABSTRACT

Concurrent rocket engine pre-conditioning and tank filling is disclosed. A disclosed example apparatus includes an inlet valve to supply a rocket propellant tank that is associated with a rocket engine with rocket propellant, and a flow director to direct at least a portion of a flow of the rocket propellant from the inlet valve to a chill line of the rocket engine to thermally condition the rocket engine as the rocket propellant tank is being filled with the rocket propellant.

25 Claims, 8 Drawing Sheets

(56) References Cited

U.S. PATENT DOCUMENTS

| | | | | |
|---|---|---|---|---|
| 8,720,181 B1* | 5/2014 | Kirshman | ............... | B64G 1/002 60/204 |
| 2005/0045772 A1* | 3/2005 | Martin | ..................... | B64G 1/14 244/159.3 |
| 2009/0288390 A1* | 11/2009 | Pavia | ........................ | F02K 9/64 60/267 |
| 2010/0326097 A1* | 12/2010 | Nguyen | .................... | F17C 9/00 62/98 |
| 2017/0114753 A1* | 4/2017 | Hue | .......................... | F02K 9/44 |

OTHER PUBLICATIONS

European Patent Office, "Extended European Search Report," issued in connection with European Patent Application No. 21198699.7, dated Dec. 22, 2021, 11 pages.

* cited by examiner

CONCURRENT ROCKET ENGINE PRE-CONDITIONING AND TANK LOADING

GOVERNMENT INTEREST

This invention was made with Government support under HR0011-17-9-0001 awarded by Defense Advanced Research Projects Agency. The government has certain rights in this invention.

FIELD OF THE DISCLOSURE

This disclosure relates generally to rocket engines and, more particularly, to concurrent rocket engine pre-conditioning and tank loading.

BACKGROUND

Some launch vehicles (e.g., spacecraft) employ propellant tanks that are filled with a cryogenic rocket fuel or propellant for launch. This cryogenic rocket propellant is also often used to thermally condition rocket engines prior to launch. In particular, the cryogenic rocket propellant is provided to a chill line of a rocket engine to thermally condition the rocket engine. Accordingly, the time taken to thermally condition the rocket engine can delay launch readiness.

Propellant tanks associated with a rocket engine are typically filled with cryogenic fluid (e.g., cryogens) to a certain height prior to thermally conditioning the rocket engine. In particular, a static head pressure of cryogenic rocket propellant, which increases with a height of a liquid column of the cryogenic rocket propellant, can be used to drive a flow of the cryogenic propellant to an inlet port, through a chill line that passes through the rocket engine and out of the rocket engine into an engine bleed line. To ensure a sufficient static head pressure to drive the flow of the cryogenic rocket propellant, the fill height of the cryogenic rocket propellant must reach a requisite height, which can take a significant time to reach and, thus, can cause a launch delay. Further, some launch vehicles may not have the necessary height (e.g., due to compactness) to generate such a requisite height.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Concurrent rocket engine pre-conditioning and tank loading is disclosed. Some known cryogenic fuel filling systems employ a static head pressure of cryogenic fuel or propellant in a fuel tank to drive a flow of the cryogenic propellant to an inlet port (e.g., a feed line) and into a chill line that passes through a rocket engine of a launch vehicle to pre-condition (e.g., thermally condition) the rocket engine. However, developing sufficient head pressure to drive such a flow requires the fuel tank to be filled to a certain height. For the cryogenic propellant to reach this height, a certain fill time is required, which can adversely affect a time to launch, thereby delaying launch readiness of the launch vehicle. In other words, known fuel filling systems employ a serial process for thermal conditioning. Further, some launch vehicles may not have the necessary height (e.g., due to compactness) to generate such a requisite height.

Examples disclosed herein enable more rapid thermal conditioning (i.e., pre-conditioning) of rocket engines that can be performed concurrently with filling of a fuel tank in contrast to a serial process. In particular, examples disclosed herein implement a flow director to cause at least a portion of a flow of rocket propellant (e.g., a cryogenic fuel, a cryogenic propellant, rocket fuel, etc.) filling a fuel tank to flow into a rocket engine via an inlet port, through a chill line within the rocket engine (e.g., the chill line extends through the rocket engine) and exit to a bleed line from the rocket engine. As a result, time-saving thermal conditioning of the rocket engine can be performed, thereby enabling launch vehicles with relatively quick launch readiness. Examples disclosed herein can also reduce or eliminate a need for costly recirculation pumps or other equipment typically needed to drive a flow of cryogenic fuel toward a rocket engine for pre-conditioning, thereby saving space and weight associated with the launch vehicle.

As used herein, the term "flow director" refers to a component, an assembly, a flow bypass and/or a relative arrangement of flow components (e.g., an arrangement of ducts and valves) used to divert or divide a fluid flow from a source flow. As used herein, the term "rocket propellant tank" refers to a tank, container and/or storage implemented to store rocket propellant used for propulsion of a vehicle, such as a rocket, launch vehicle, spacecraft and/or land vehicle.

Figure 1:
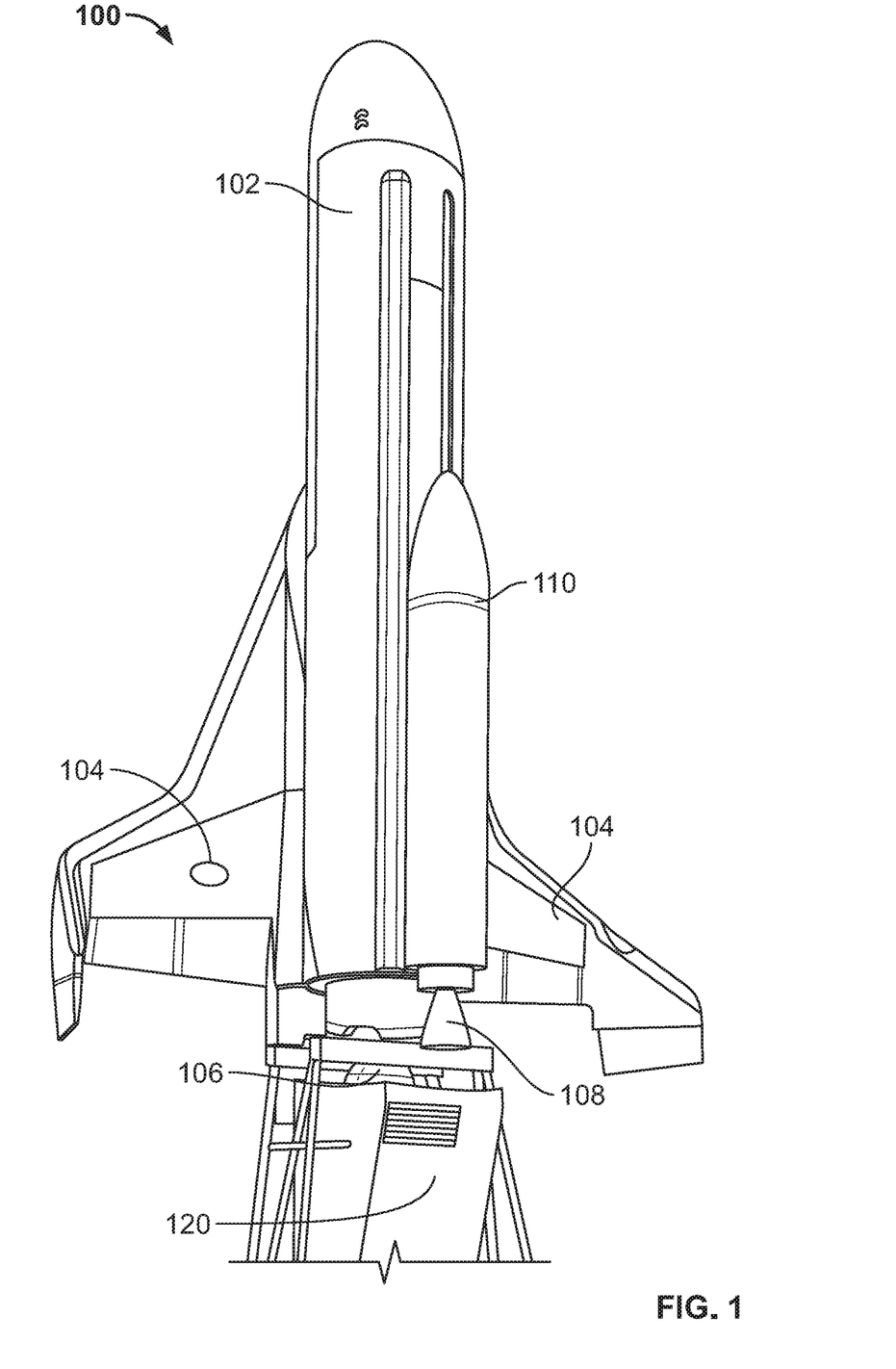
FIG. 1 illustrates a launch vehicle in which examples disclosed herein can be implemented.

FIG. 1 illustrates a launch vehicle 100 (e.g., a spacecraft) in which examples disclosed herein can be implemented. The launch vehicle 100 is used repeatedly to launch payloads (e.g., satellites) into orbit and includes a fuselage 102 of a booster, wings 104, main rocket engines or thrusters 106, an auxiliary rocket engine or thruster 108, and an upper stage 110. In the illustrated view of FIG. 1, the launch vehicle 100 is positioned on a launch pad 120 and oriented relative to ground for launch.

In operation, the upper stage 110 is used to carry a payload into orbit after the upper stage is separated from the aforementioned booster. Propulsion of the launch vehicle 100 is also accomplished by use of the main rocket engines 106. Accordingly, the wings 104 are used to guide the launch vehicle 100 to a return location following an orbital mission and subsequent re-entry of the launch vehicle 100. In other words, the example launch vehicle 100 can be used repeatedly for space missions and has a characteristic launch readiness time, as well as a turn-around time (e.g., relaunch time). In this example, both the launch-readiness time and the turn-around time of the launch vehicle 100 are defined by a time needed for the rocket engines 106, 108 to be thermally pre-conditioned for launch. In particular, the rocket engines 106, 108 are thermally conditioned by corresponding flows of rocket propellant during respective filling processes.

While the example of FIG. 1 is shown implemented as a launch vehicle, any appropriate application may be used to implement examples disclosed herein. In particular, examples disclosed herein can be implemented in aircraft, land vehicles, or any other appropriate rocket engine-based applications.

Figure 2:
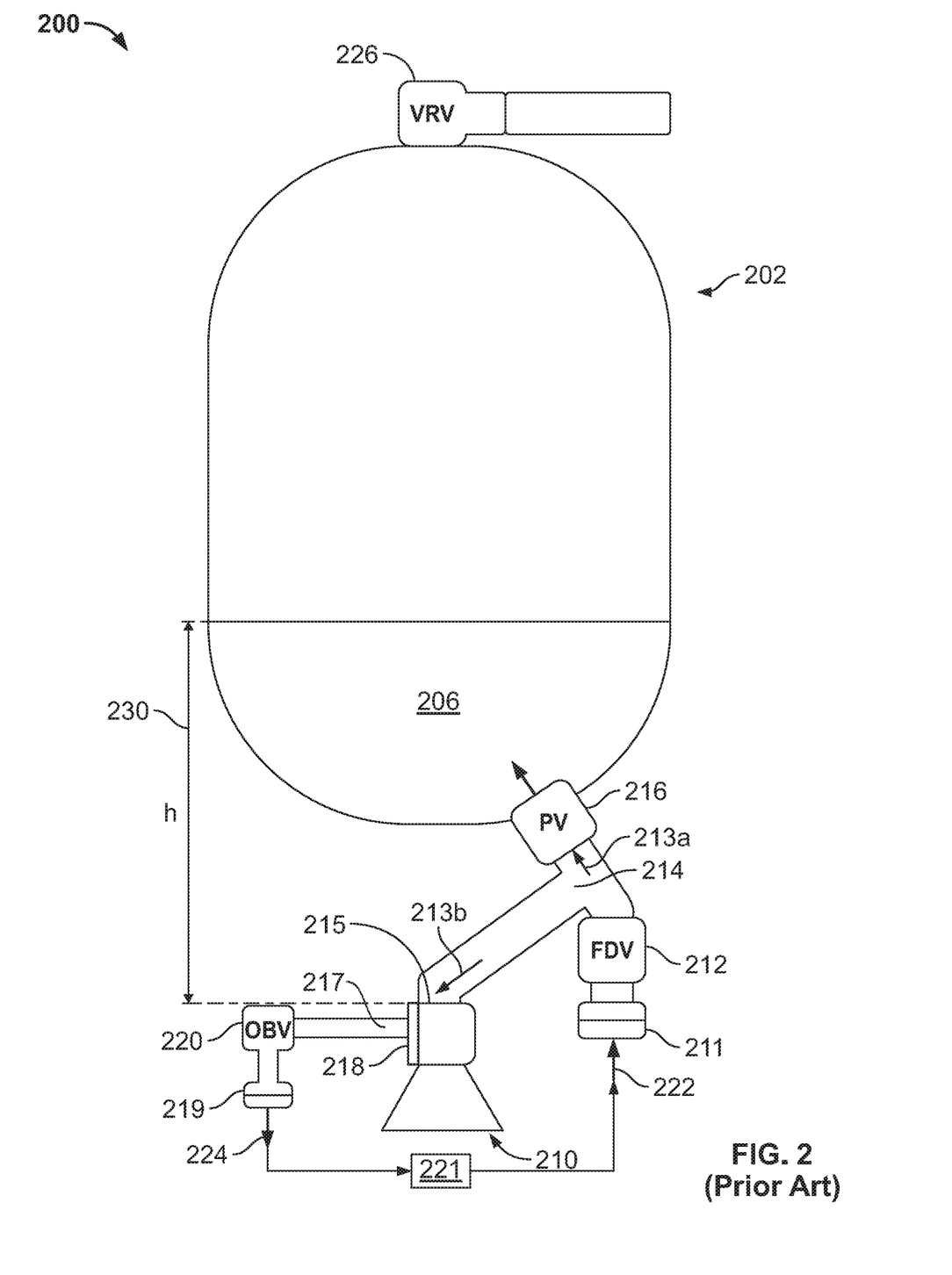
FIG. 2 is a cross-sectional view of a known rocket propellant filling system.

FIG. 2 is a cross-sectional view of a known rocket propellant filling system 200. The known rocket propellant filling system 200 includes a rocket propellant tank 202 that receives and stores rocket propellant (e.g., cryogenic propellant, rocket propellant, cryogenic fuel, etc.) 206. The known rocket propellant filling system 200 also includes a rocket engine 210, an interface (e.g., a fill/drain interface) 211, a fill/drain valve (FDV) (e.g., an inlet valve) 212, a propellant line (e.g., a fuel junction tube, a fuel conduit) 214, a feed line 215, a pre-valve (PV) 216, an engine bleed line 217 and a chill line (e.g., a rocket engine chill line) 218. The rocket propellant filling system 200 further includes an interface 219 (e.g., an outlet) and an overboard bleed valve (OBV) 220. In some known examples, the rocket propellant system 200 includes a recirculation pump 221 and a vent/relief valve (VRV) 226.

To fill the rocket propellant tank 202 with the rocket propellant 206, the interface 211 is provided with the rocket propellant 206, as generally indicated by an arrow 222. As a result, the rocket propellant 206 flows into the propellant line 214 and is divided into a first divided flow 213a of the rocket propellant 206 that flows into the PV 216 and, in turn, into the rocket propellant tank 202.

To pre-condition (e.g., thermally condition) the rocket engine 210 via the chill line 218, a second divided flow 213b of the rocket propellant 206 flows toward the feed line 215 of the rocket engine 210, through the chill line 218 and out of the rocket engine 210 via the engine bleed line 217. However, the second divided flow requires a static head pressure to be developed in the rocket propellant tank 202 based on a relative height of a column of fluid, which is shown as a height 230 in FIG. 2. Accordingly, the second divided flow 213b can take a significant time to develop and, thus, can prolong pre-conditioning the engine 210, thereby delaying a launch readiness of the launch vehicle 100.

Further, at least a portion of the rocket propellant 206 is drained from the OBV 220, as generally indicated by an arrow 224. Additionally, the propellant 206 can be provided back to the interface 211 via the recirculation pump 221.

In contrast to the known rocket propellant filling system 200, examples disclosed herein do not necessitate a time-consuming buildup of the static head pressure to push a flow of the rocket propellant 206 for thermal pre-conditioning. In particular, examples disclosed herein direct flow of the rocket propellant 206 to the chill line 218 as the rocket propellant tank 202 is filled to save time, thereby enabling quicker launch readiness times and/or re-launches of the launch vehicle 100. Further, examples disclosed herein do not necessitate a height of the rocket propellant 206.

Figure 3:
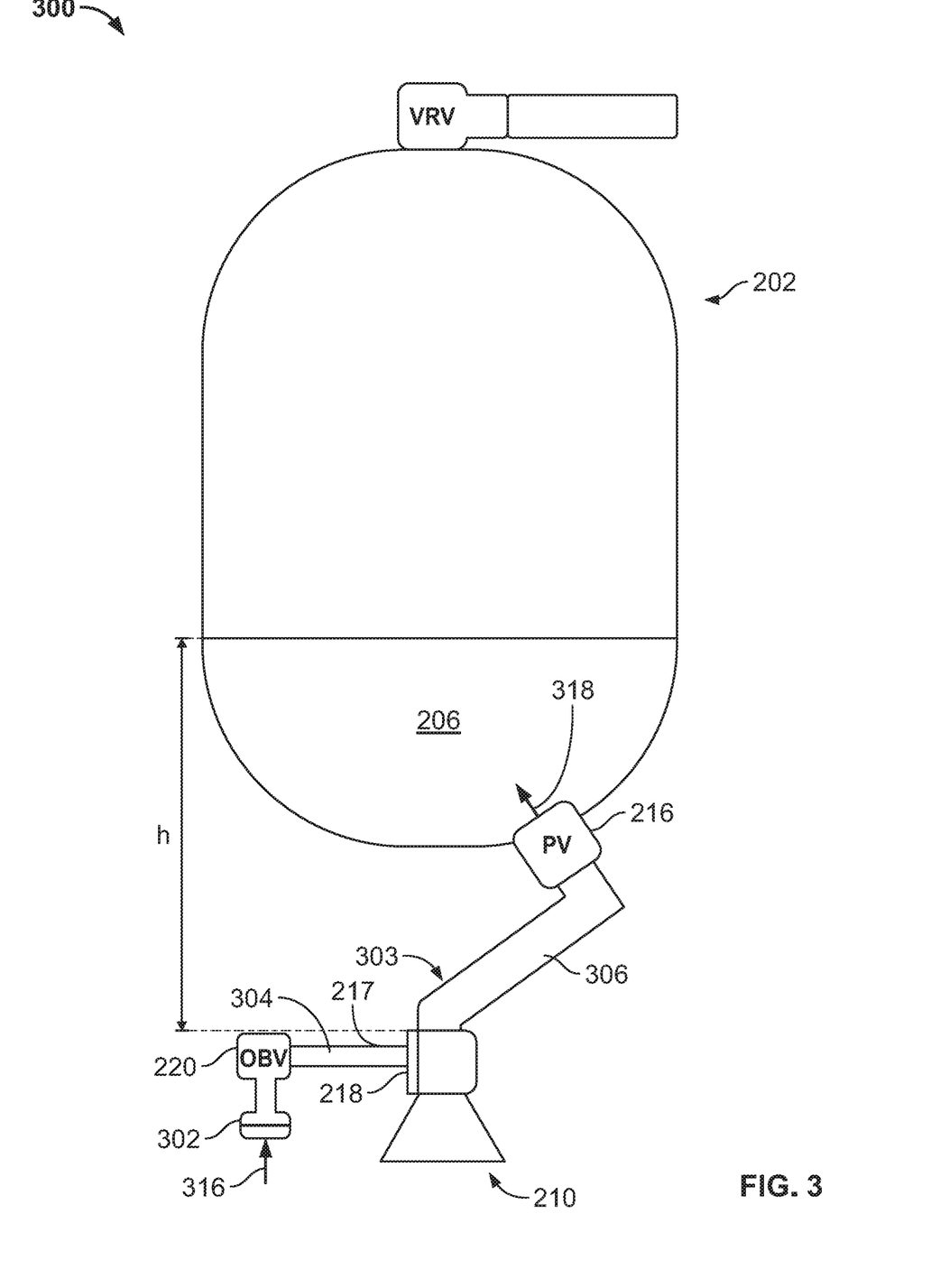
FIG. 3 is a cross-sectional view of an example rocket propellant filling system in accordance with the teachings of this disclosure.

FIG. 3 is a cross-sectional view of an example rocket propellant filling system 300 in accordance with the teachings of this disclosure. The rocket propellant system 300 of the illustrated example includes the aforementioned rocket propellant tank 202 to which the rocket propellant 206 is provided, the rocket engine 210 with the corresponding chill line 218, the OBV 220 and the PV 216 shown in FIG. 2. The example rocket propellant system 300 also includes an interface 302 (e.g., an inlet interface, an inlet), a flow director 303, which includes a first propellant line 304, and a second propellant line 306. In this example, the second propellant line 306 is disposed between the chill line 218 and the rocket propellant tank 202.

To concurrently thermally condition the rocket engine 210 while the rocket propellant tank 202 is filled flow director 303 operates as a means for concurrently providing the rocket propellant 206 to the rocket engine 210 and the chill line 218 during filling. In particular, the rocket propellant 206 is provided to the interface 302, as generally indicated by an arrow 316. As a result, the rocket propellant 206 passes through the chill line 218 to pre-condition the rocket engine 210 prior to the rocket propellant 206 flowing through the second propellant line 306, the PV 216 and, subsequently, into the rocket propellant tank 202, as generally indicated by an arrow 318. In other words, the chill line 218 is upstream of the rocket propellant tank 202 for concurrent pre-conditioning of the rocket engine 210 in this example. As a result, concurrent pre-conditioning of the rocket engine 210 while the rocket propellant tank 202 is being filled is enabled without a need for a developed static head pressure. Thus, significant time is saved in preparing the launch vehicle 100 for launch readiness. Further, height required to develop a static pressure head is not necessitated, thereby allowing more compact design of the rocket propellant tank 202 and/or the flow director 303.

Further, extra equipment, which can add weight and take up significant internal volume of the launch vehicle 100, is not necessary to pre-condition the rocket 210 in this example. In this particular example, the FDV 212 and the interface 211 are not needed for pre-conditioning the rocket engine 210, thereby saving weight and space of the launch vehicle 100.

In this example, the second propellant line 306 is angled at approximately 35 to 55 degrees from horizontal when the launch vehicle 100 is oriented to be ready for launch (as shown in FIG. 1). However, any appropriate angular range can be implemented instead. In this particular example, an entire flow of the rocket propellant 206 is used to pre-condition the engine 210 prior to filling the rocket propellant tank 202.

Figure 4:
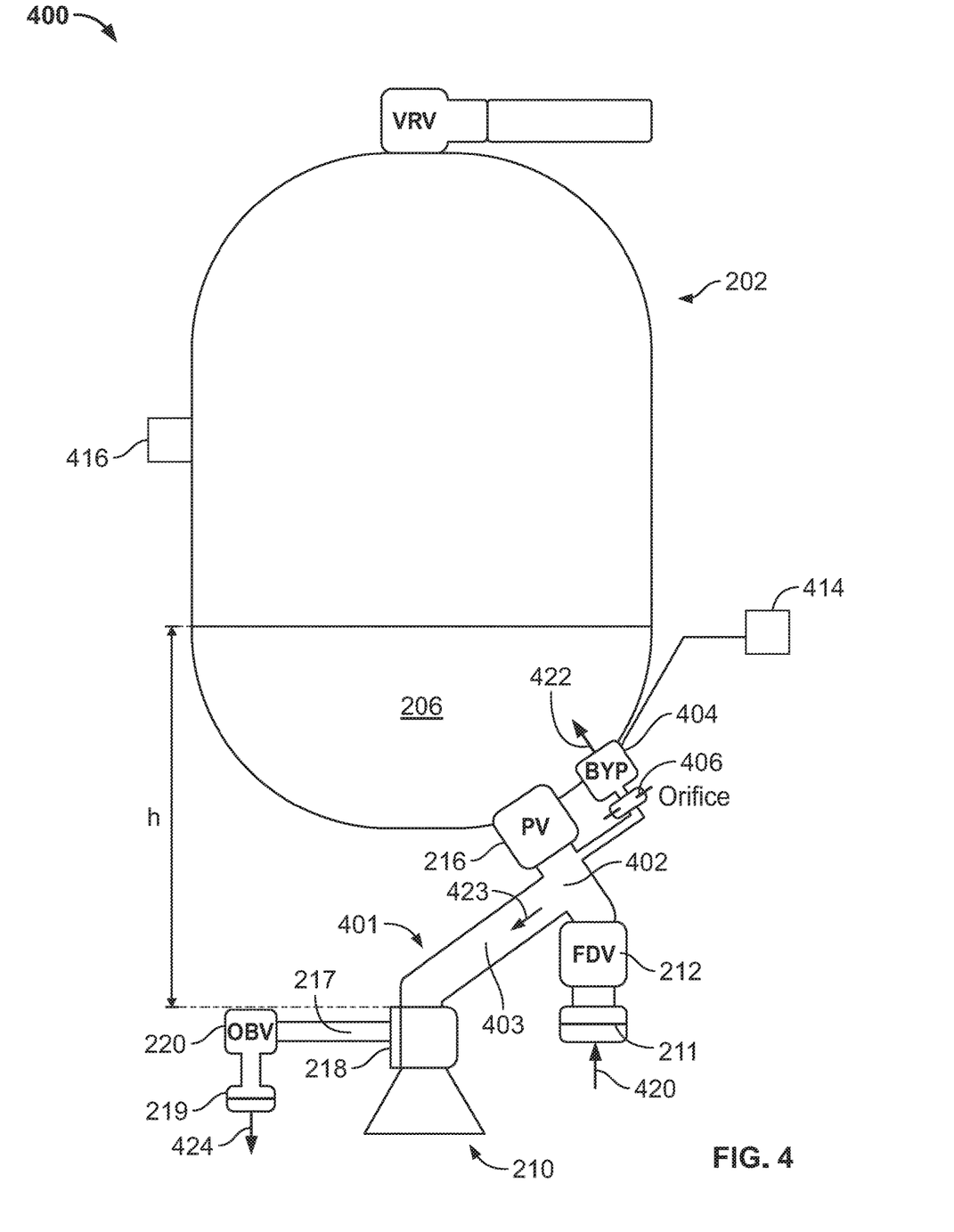
FIG. 4 is a cross-sectional view of another example rocket propellant filling system in accordance with the teachings of this disclosure.

FIG. 4 is a cross-sectional view of another example rocket propellant filling system 400 in accordance with the teachings of this disclosure. The rocket propellant filling system 400 of the illustrated example includes the rocket propellant tank 202 that is to be filled with the rocket propellant 206, the interface 211, the FDV 212, the PV 216, the chill line 218 and the bleed line 217 of the rocket engine 210, and the OBV 220. The example rocket propellant filling system 400 also includes flow director (e.g., a means for concurrently providing the rocket propellant 206 to the rocket engine 210 and the propellant tank 202 during filling) 401 having a propellant line (e.g., a fuel branch, a pipe branch, etc.) 402, a propellant line 403 and a bypass valve (e.g., a bypass inlet valve, a fixed or variable position valve, a means for varying an opening of an inlet, etc.) 404, which is fluidly coupled to the rocket engine 210, the rocket propellant tank 202 and the interface 211 in this example. The bypass valve 404 is included with and/or operatively coupled to an adjustable opening or orifice (e.g., an orifice plate, an opening of an inlet of the rocket propellant tank 202) 406. The rocket propellant system 400 also includes a bleed interface 219. In some examples, the rocket propellant system 400 includes a valve controller (e.g., a bypass valve controller) 414 and/or a sensor (e.g., a fill sensor, an optical sensor, a thermal sensor, a pressure sensor, a means for detecting a fill level, etc.) 416.

According to the illustrated example, the rocket propellant 206 is provided to the interface 211, as generally indicated by an arrow 420. The rocket propellant 206 then flows through the chill line 218 of the rocket engine 210 and into the bleed line 217 via the propellant lines 402, 403 and also past the bypass valve 404 into the rocket propellant tank 202, as generally indicated by an arrow 422, with the PV 216 closed. Depending on a degree to which the opening 406 is opened, some of the rocket propellant 206 is caused to flow toward the rocket engine 210, as generally indicated by an arrow 423. In particular, when the opening 406 is partially or significantly closed, more of the rocket propellant 206 flows toward the chill line 218 of the rocket engine 210 instead of the rocket propellant tank 202 due to a back pressure generated by the flow through the opening 406. In this example, the opening 406 and the bypass valve 404 increases a pressure acting upon the rocket propellant 206 to exceed a static pressure head of the rocket propellant 206 stored in the rocket propellant tank 202. Further, the rocket propellant 206 flows through the bleed line 217, the OBV 220 and out through the bleed interface 219, after pre-conditioning the rocket engine 210, as generally indicated by an arrow 424.

In some other examples, a recirculation pump is implemented between the bleed interface 219 and the interface 211. In some examples, a degree to which the opening 406 is opened is varied by the valve controller 414 as the rocket propellant tank 202 is filled. In particular, a degree to which the opening 406 is opened can be based on a fill measurement from the sensor 416. For example, a function (e.g., a linear function, a time-based function, etc.) defines a relationship between a fill level of the rocket propellant tank 202 and a degree to which the bypass valve 404 opens or closes the opening 406. In some examples, a temperature sensor is implemented in conjunction with the rocket engine 210, the bleed line 217 and/or the chill line 218 to measure a temperature and/or temperature history to be used in determining or calculating a desired flow and/or flow rate of the rocket propellant 206 toward the chill line 218 that passes through the rocket engine 210.

Figure 5:
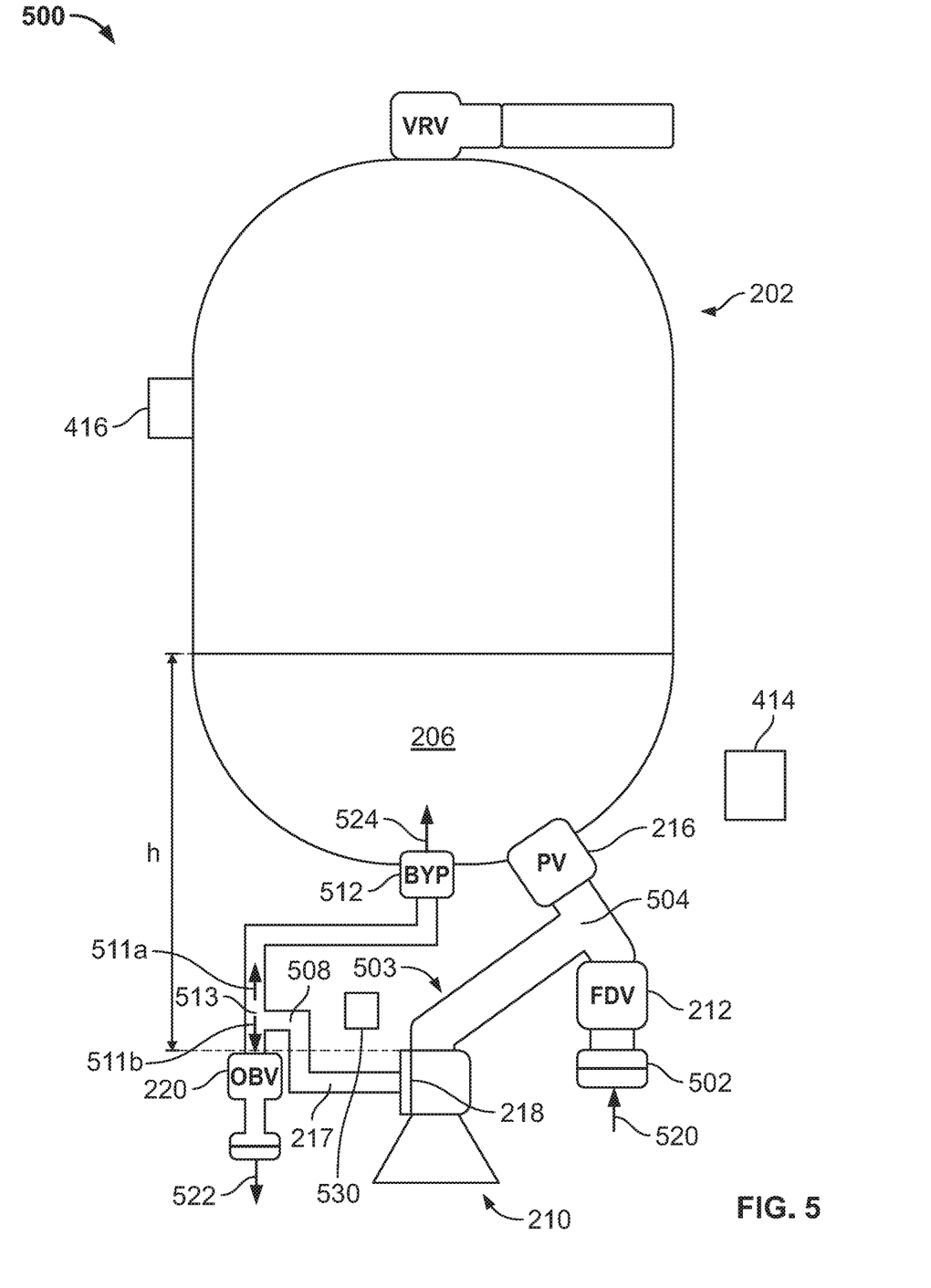
FIG. 5 is a cross-sectional view of yet another example rocket propellant filling system in accordance with the teachings of this disclosure.

FIG. 5 is a cross-sectional view of yet another example rocket propellant filling system 500 in accordance with the teachings of this disclosure. According to the illustrated example, the rocket propellant filling system 500 includes the rocket propellant tank 202 with the rocket propellant 206, the FDV 212, the PV 216, the chill line 218, the bleed line 217, and the OBV 220 of FIG. 2. The example rocket propellant filling system 500 also includes an interface (e.g., an inlet interface) 502, and a flow director 503. The flow director (e.g., a means for concurrently providing the rocket propellant 206 to the rocket engine 210 and the chill line 218) 503 includes a propellant line 504, a bypass (e.g., a bypass branch) 508, and a bypass valve (e.g., an inlet bypass valve) 512.

According to the illustrated example, the rocket propellant 206 is provided to the inlet 502, as generally indicated by an arrow 520, and can flow either through the PV 216 or through the chill line 218 of the rocket engine 210. Further, the bypass 508 defines a t-shaped juncture 513. In particular, the t-shaped juncture 513 defines a first branch or path 511*a* of rocket propellant 206 toward the bypass valve 512 and a second branch or path 511*b* of the rocket propellant 206 toward the OBV 220. During pre-conditioning of the engine 210, the rocket propellant 206 is caused to flow toward the chill line 218 and through the bypass valve 512 into the rocket propellant tank 202, as generally indicated by an arrow 524, by closing the PV 216 and OBV 220. In other words, the example valve 512 functions as a means for providing the rocket propellant 206 to the rocket propellant tank 202 from an outlet of the engine bleed line 217. In some examples, as the rocket propellant tank 202 is filled with the rocket propellant 206, the OBV 220 causes at least a portion of the rocket propellant 206 to be drained, as generally indicated by an arrow 522.

The example rocket propellant filling system 500 enables multiple fill configurations. In a first fill configuration, the PV 216 is open, the OBV 220 is closed and the bypass valve 512 is open so that the rocket engine 210 can percolate chill with relatively low flow of the rocket propellant 206 through the chill line 218, while the rocket propellant tank 202 is at a full-flow fill. In a second fill configuration, the PV 216 is closed, the OBV 220 is closed and the bypass valve 512 is open so that the rocket engine 210 is at a full-flow chill and rocket propellant tank 202 is at a full-flow fill. In a third fill configuration, the PV 216 is closed, the OBV 220 is open and the bypass valve 512 is open so that the rocket engine 210 is at a full-flow chill and rocket propellant tank 202 is at a partial flow fill (e.g., based on a variable position valve implemented in the OBV 220). As a result, numerous filling and rocket pre-conditioning scenarios are enabled based on current cooling and filling needs of the launch vehicle 100.

In some examples, the FDV 212, the PV 216, the OBV 220, and/or the bypass valve 512 are controlled (e.g., controlled in a coordinated manner) by a controller, such as the valve controller 414 of FIG. 4. In such examples, the sensor 416 can be implemented to determine a fill level of the rocket propellant tank 202 to facilitate proper control therebetween. In other examples, a sensor 530 is utilized to determine a temperature and/or heat transfer (e.g., a heat flux, a heat variation rate, etc.) associated with the rocket engine 210 for proper coordinated control of the FDV 212, the PV 216, the OBV 220 and/or the bypass valve 512.

Figure 6:
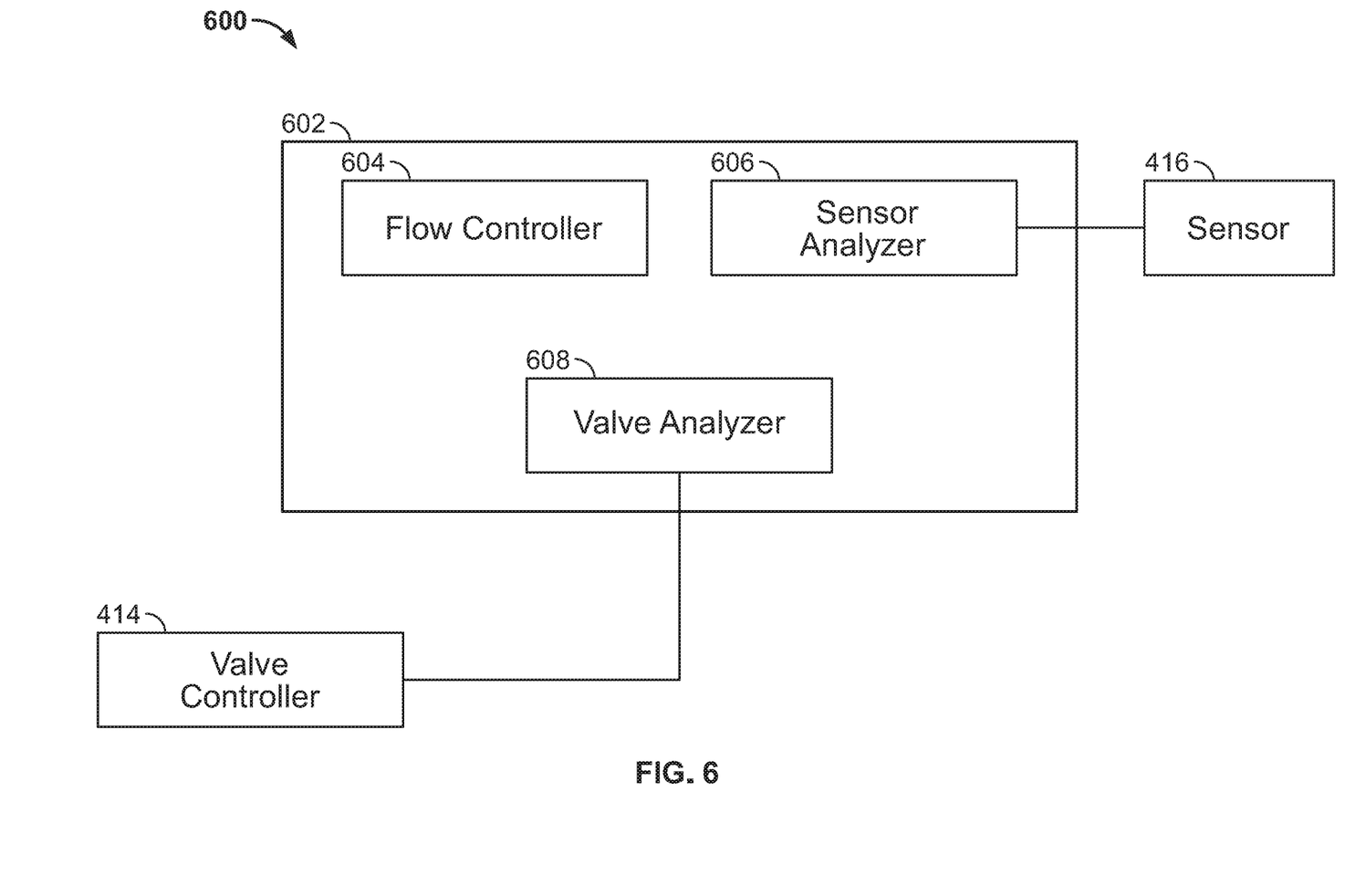
FIG. 6 is a schematic overview of a rocket propellant analysis system that may be implemented in examples disclosed herein.

FIG. 6 is a schematic overview of a rocket propellant analysis system 600 that may be implemented in examples disclosed herein. In particular, the rocket propellant analysis system 600 can be implemented in the valve controller 414 of FIG. 4 to vary a degree to which any of the valves disclosed herein are opened or closed to control pre-conditioning of the rocket engine 210 and filling of the rocket propellant tank 202. The example rocket propellant analysis system 600 includes a transfer analyzer 602, which includes a flow controller 604, a sensor analyzer 606 and a valve analyzer 608. In some examples, the valve analyzer 608 is communicatively coupled to the valve controller 414. Further, the sensor analyzer 606 is communicatively coupled to the sensor 416, in some examples.

The flow controller 604 of the illustrated example determines a degree to which the rocket propellant 206 is to flow through the chill line 218. For example, the flow controller 604 can define a flow setpoint based on a desired heat transfer from the rocket engine 210, a cooling time, a launch readiness time and/or a desired turn-around time of the launch vehicle 100. In some examples, the flow controller 604 and/or the sensor analyzer 606 calculate a desired heat flux from the engine 210. In some examples, the flow controller 604 is communicatively coupled to a flow sensor operatively coupled to the chill line 218, the bleed line 217 and/or the engine 210.

In some examples, the sensor analyzer 606, which is communicatively coupled to the sensor 416, determines and/or characterizes a fill level of the rocket propellant tank 202. Additionally or alternatively, the sensor analyzer 606 analyzes cooling trends or history associated with the rocket engine 210 and/or the chill line 218 (e.g., via a temperature sensor associated with the chill line 218). Additionally or alternatively, the fill sensor analyzer 606 and/or the flow controller 604 determines a desired fill rate of the rocket propellant tank 202.

According to the illustrated example, the valve analyzer 608 determines a set position of the bypass valve 404, the bypass valve 512, the OBV 220, the FDV 212, and/or the PV 216 to achieve a desired fill rate of the rocket propellant tank 202 and/or a desired pre-conditioning of the rocket engine 210. In some examples, the desired set position(s) and/or time-based set position(s) are calculated by the valve analyzer 608 to reduce and/or minimize a launch readiness time and/or turn-around time of the launch vehicle 100.

While an example manner of implementing the rocket propellant analysis system 600 of FIG. 6 is illustrated in FIG. 6, one or more of the elements, processes and/or devices illustrated in FIG. 6 may be combined, divided, re-arranged, omitted, eliminated and/or implemented in any other way. Further, the example flow controller 604, the example sensor analyzer 606, the example valve analyzer 608, the example valve controller 414 and/or, more generally, the example rocket propellant analysis system 600 of FIG. 6 may be implemented by hardware, software, firmware and/or any combination of hardware, software and/or firmware. Thus, for example, any of the example flow controller 604, the example sensor analyzer 606, the example valve analyzer 608, the example valve controller 414 and/or, more generally, the example rocket propellant analysis system 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, flow controller 604, the example sensor analyzer 606, the example valve analyzer 608, and/or the example flow controller 414 is/are hereby expressly defined to include a non-transitory computer readable storage device or storage disk such as a memory, a digital versatile disk (DVD), a compact disk (CD), a Blu-ray disk, etc. including the software and/or firmware. Further still, the example rocket propellant analysis system 600 of FIG. 6 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
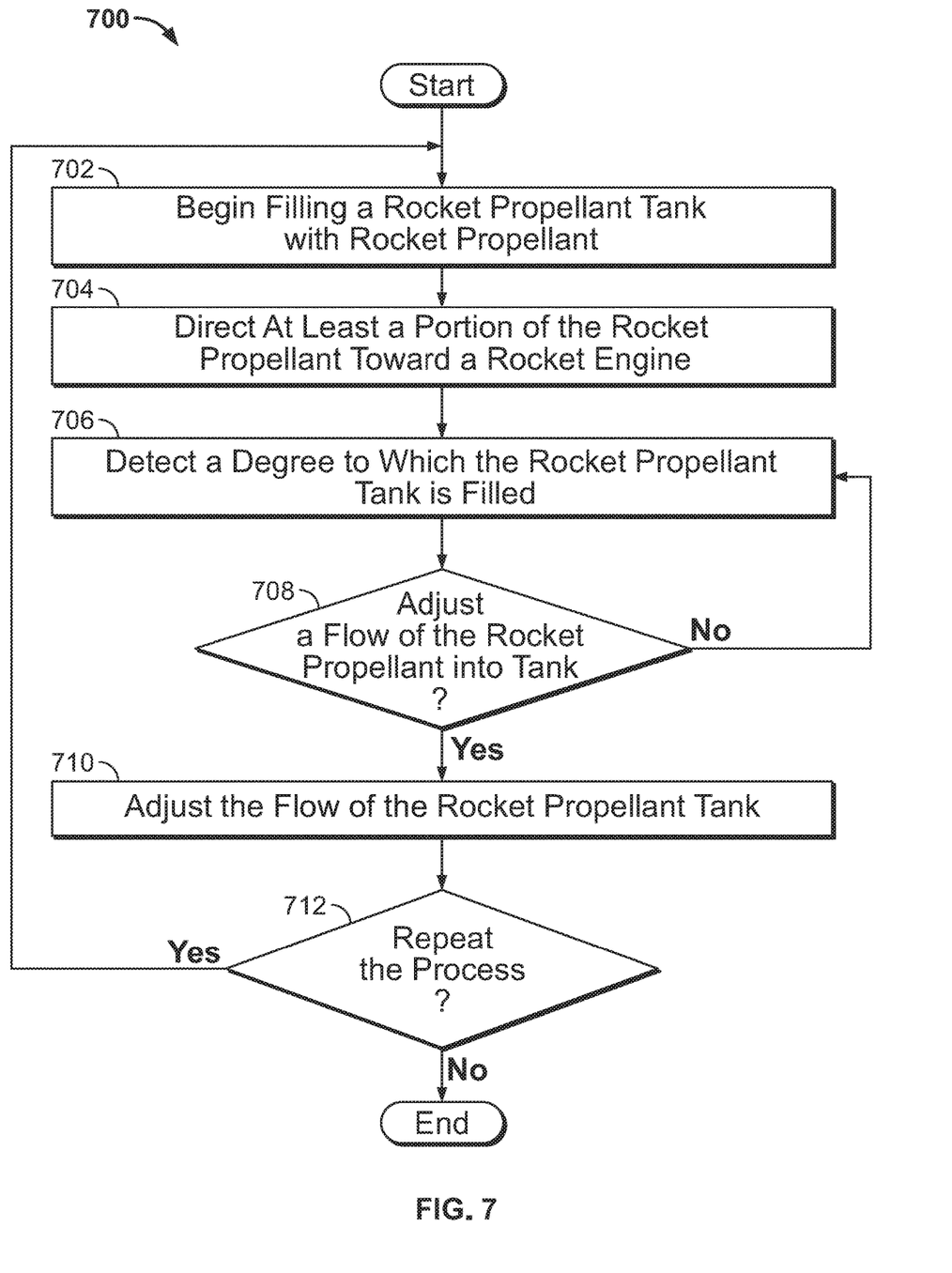
FIG. 7 is a flowchart representative of an example method that can be used to implement examples disclosed herein.

A flowchart representative of example hardware logic, machine readable instructions, hardware implemented state machines, and/or any combination thereof for implementing the rocket propellant analysis system 600 of FIG. 6 is shown in FIG. 7. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example rocket propellant analysis system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The example method 700 of FIG. 7 begins as the rocket propellant tank 202 is to be filled with the rocket propellant 206 while pre-conditioning the engine 210.

In this example, filling of the rocket propellant tank 202 with the rocket propellant 206 begins (block 702). In particular, the rocket propellant 206 begins to fill the rocket propellant tank 202 and can have a relatively low static head pressure within the rocket propellant tank 202 during an initial filling period.

According to the illustrated example, a flow director (e.g., the flow director 303, the flow director 401, the flow director 503) is utilized to direct at least a portion of the rocket propellant 206 to flow toward the chill line 218 of the rocket engine 210 (block 704).

In some examples, the sensor 416 detects a degree to which the rocket propellant tank 202 is filled (block 706). In other examples, the sensor 416 detects a flow rate of the rocket propellant 206 into the rocket propellant tank 202 over time.

It is next determined by the flow controller 604, the sensor analyzer 606 and/or the valve analyzer 608 whether to adjust a flow and/or a rate to which the rocket propellant 206 fills the rocket propellant tank 202 (block 708). If the rate is to be adjusted (block 708), control of the process proceeds to block 710. Otherwise, control of the process returns to block 706.

At block 710, the flow controller 604 and/or the valve controller 414 adjust the flow of the rocket propellant 206 into the rocket propellant tank 202. In some examples, the flow controller 604 controls a flow of the rocket propellant 206 to the chill line 218 based on a desired pre-conditioning of the rocket engine 210. Additionally or alternatively, the valve analyzer 608 directs the valve controller 414 to control the bypass valve 404, the OBV 220, the FDV 212, the PV 216 and/or the bypass valve 512 for a desired pre-conditioning of the rocket engine 210 while filling the rocket propellant tank 202.

It is then determined whether to repeat the process (block 712). If the process is to be repeated (block 712), control of the process returns to block 702. Otherwise, the process ends.

Figure 8:
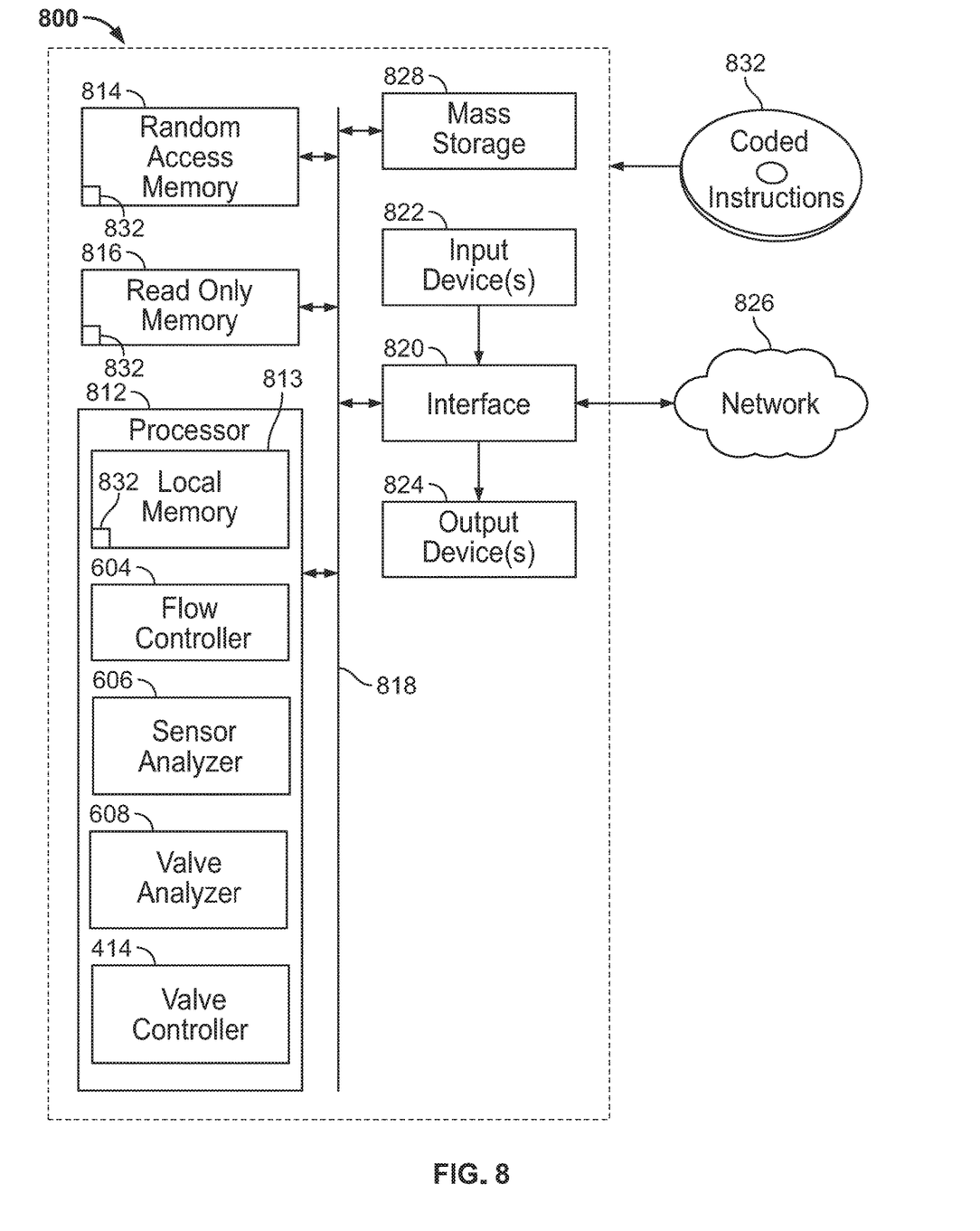
FIG. 8 is a block diagram of an example processing platform structured to execute instructions to implement the example method of FIG. 7 and/or the rocket propellant analysis system of FIG. 6.

FIG. 8 is a block diagram of an example processor platform 800 structured to execute the instructions of FIG. 7 to implement the rocket propellant analysis system 600 of FIG. 6. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example flow controller 604, the example sensor analyzer 606, the example valve analyzer 608 and the example valve controller 414.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

Example 1 includes an apparatus having an inlet valve to supply a rocket propellant tank that is associated with a rocket engine with rocket propellant, and a flow director to direct at least a portion of a flow of the rocket propellant from the inlet valve to a chill line of the rocket engine to thermally condition the rocket engine as the rocket propellant tank is being filled with the rocket propellant.

Example 2 includes the apparatus of Example 1, where the chill line is disposed between the rocket propellant tank and the inlet valve.

Example 3 includes the apparatus of Example 2, and further includes a propellant line disposed between an engine bleed line and a pre-valve associated with an inlet of the rocket propellant tank.

Example 4 includes the apparatus of Example 1, and further includes a bypass valve disposed between the chill line and the rocket propellant tank to drive flow toward the chill line.

Example 5 includes the apparatus of Example 4, and further includes a valve controller to vary a degree to which the bypass valve is opened based on an amount of the rocket propellant in the rocket propellant tank.

Example 6 includes the apparatus of Example 1, and further includes a bypass branch that extends from an exit of an engine bleed line to a bypass inlet valve of the rocket propellant tank.

Example 7 includes the apparatus of Example 6, and further includes a t-shaped juncture defined by the bypass branch, where an overboard bleed valve is disposed at a first branch of the t-shaped juncture, and where the bypass inlet valve is disposed at a second branch of the t-shaped juncture.

Example 8 includes a method including filling, via an inlet valve, a rocket propellant tank associated with a rocket engine with rocket propellant, and concurrent to the filling of the inlet valve, directing, by use of a flow director, at least a portion of a flow of the rocket propellant toward a chill line of the rocket engine to thermally condition the rocket engine.

Example 9 includes the method of Example 8, and further includes determining a degree to which the rocket propellant tank is filled with rocket propellant, and varying, via a valve controller, a size of an opening of an adjustable inlet valve of the rocket propellant tank based on the degree to which the rocket propellant tank is filled to control the portion of the rocket propellant flowing toward the chill line.

Example 10 includes the method of Example 8, where the entire flow of the rocket propellant from the inlet valve is directed to an engine bleed line that is upstream of the rocket propellant tank.

Example 11 includes the method of Example 8, and further includes directing the rocket propellant from an exit of the chill line toward a bypass inlet valve of the rocket propellant tank.

Example 12 includes the method of Example 11, where the bypass inlet valve is at a first juncture of a t-shaped joint that is in fluid communication with the exit of the chill line, and further includes varying an amount of the rocket propellant flowing toward an overboard bleed valve disposed at a second juncture of the t-shaped joint.

Example 13 includes a launch vehicle having a rocket engine, a rocket propellant tank associated with the rocket engine, an inlet valve to provide rocket propellant to the rocket propellant tank, and a flow director to direct at least a portion of a flow of the rocket propellant toward a chill line of the rocket engine to thermally condition the rocket engine while the rocket propellant tank is concurrently filled.

Example 14 includes the launch vehicle of Example 13, and further includes a bypass valve disposed between the inlet valve and the rocket propellant tank to vary a degree to which the rocket propellant flows to the chill line.

Example 15 includes the launch vehicle of Example 14, and further includes a valve controller to vary a degree to which the bypass valve is opened based on an amount of the rocket propellant present within the rocket propellant tank.

Example 16 includes the launch vehicle of Example 13, where the chill line is disposed between the rocket propellant tank and the inlet valve.

Example 17 includes the launch vehicle of Example 13, and further includes a bypass branch that is in fluid communication with an exit of the chill line.

Example 18 includes the launch vehicle of Example 17, and further includes an overboard bleed valve disposed at a first branch of a t-shaped juncture defined by the bypass branch, and an inlet bypass valve of the rocket propellant tank disposed at a second branch of the t-shaped juncture.

Example 19 includes the launch vehicle of Example 13, where the rocket propellant tank is part of a booster rocket of the launch vehicle.

Example 20 includes the launch vehicle of Example 13, where the flow director includes a plurality of valves, and further includes a valve controller to coordinate opening and closing of the valves during a filling process of the rocket propellant tank.

Example 21 includes an apparatus having means for filling a rocket propellant tank with rocket propellant having means for concurrently providing the rocket propellant to a chill line of a rocket engine as the rocket propellant tank is filled.

Example 22 includes the apparatus of Example 21, and further includes means for detecting a fill level of the rocket propellant tank.

Example 23 includes the apparatus of Example 22, and further includes means for varying an opening of an inlet of the rocket propellant tank based on the fill level.

Example 24 includes the apparatus of Example 21, and further includes means for providing the rocket propellant to the rocket propellant tank from an outlet of an engine bleed line.

From the foregoing, it will be appreciated that example methods, apparatus and articles of manufacture have been disclosed that enable time-efficient filling of cryogenic rocket fuel tanks. As a result, examples disclosed herein enable relatively quick launch readiness and/or turn-around times for launch vehicles or spacecraft, for example. In other words, rapid-response launch vehicles are enabled by examples disclosed herein. Examples disclosed herein can save approximately one to two hours, for example, to launch readiness from known cryogenic fuel filling systems used in current launch vehicles.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are shown related to launch vehicles, examples disclosed herein can be implemented with any fluid filling application or vehicle type.

What is claimed is:

1. An apparatus comprising:
a valve to supply a rocket propellant tank that is associated with a rocket engine with rocket propellant;
a supply line to couple the rocket propellant tank to the valve;
a bleed line of the rocket engine coupled to the valve, the bleed line separate from the supply line and upstream of the rocket propellant tank;
a flow director to direct at least a portion of a flow of the rocket propellant from the valve to the bleed line of the rocket engine to thermally condition the rocket engine as the rocket propellant tank is being filled with the rocket propellant;
a propellant line between the rocket propellant tank and the bleed line, the propellant line to receive the rocket propellant from the rocket engine and to be angled from ground at an angle in a range from 35 to 55 degrees when the rocket propellant tank is upright relative thereto such that the angle of the propellant line facilitates filling of the rocket propellant tank from the rocket engine; and
a pre-valve between the propellant line and the rocket propellant tank, the pre-valve at an inlet of the rocket propellant tank to receive the rocket propellant from the propellant line and to supply the rocket propellant from the propellant line to the rocket propellant tank.

2. The apparatus as defined in claim 1, wherein the rocket engine is between the rocket propellant tank and the valve.

3. The apparatus as defined in claim 1, further including a bypass valve between the bleed line and the rocket propellant tank to drive flow toward the bleed line.

4. The apparatus as defined in claim 3, further including a valve controller to vary a degree to which the bypass valve is opened based on an amount of the rocket propellant in the rocket propellant tank.

5. The apparatus as defined in claim 1, further including a bypass branch that extends from an exit of the bleed line to a bypass inlet valve of the rocket propellant tank.

6. The apparatus as defined in claim 5, further including a t-shaped juncture defined by the bypass branch, wherein an overboard bleed valve is at a first branch of the t-shaped juncture, and wherein the bypass inlet valve is at a second branch of the t-shaped juncture.

7. The apparatus as defined in claim 1, wherein the bleed line is to be coupled to the supply line in the rocket engine.

8. The apparatus as defined in claim 1, wherein the flow director is to couple the supply line to the bleed line in the rocket engine.

9. A method comprising:
filling, via a valve and a supply line, a rocket propellant tank associated with a rocket engine with rocket propellant, the rocket propellant tank to be filled via a pre-valve at an inlet of the rocket propellant tank; and
concurrent to the filling of the rocket propellant tank, directing, by use of a flow director, at least a portion of a flow of the rocket propellant toward: i) a bleed line of the rocket engine to thermally condition the rocket engine, wherein the bleed line is coupled to the supply line, and (ii) a propellant line between the rocket engine and the rocket propellant tank, wherein the propellant line is angled from ground at an angle of approximately 35-55 degrees relative to the rocket propellant tank being in an upright position such that the angle of the propellant line facilitates filling of the rocket propellant tank from the rocket engine, the propellant line upstream of the rocket propellant tank.

10. The method as defined in claim 9, further including:
determining a degree to which the rocket propellant tank is filled with rocket propellant; and
varying, via a valve controller, a size of an opening of an adjustable inlet valve of the rocket propellant tank based on the degree to which the rocket propellant tank is filled to control the portion of the rocket propellant flowing toward the bleed line.

11. The method as defined in claim 9, further including directing the rocket propellant from an exit of the bleed line toward a bypass inlet valve of the rocket propellant tank.

12. The method as defined in claim 11, wherein the bypass inlet valve is at a first juncture of a t-shaped joint that is in fluid communication with the exit of the bleed line, and further including varying an amount of the rocket propellant flowing toward an overboard bleed valve at a second juncture of the t-shaped joint.

13. A method comprising:
filling, via a valve, a rocket propellant tank associated with a rocket engine with rocket propellant, the rocket propellant tank to be filled via a pre-valve at an inlet of the rocket propellant tank; and
concurrent to the filling of the rocket propellant tank, directing, by use of a flow director, at least a portion of a flow of the rocket propellant toward a chill line of the rocket engine to thermally condition the rocket engine, wherein an entire flow of the rocket propellant from the valve is directed to a propellant line that is angled from ground at an angle of approximately 35 to 55 degrees relative to the rocket propellant tank being in an upright position such that the angle of the propellant line facilitates filling of the rocket propellant tank from the rocket engine, the propellant line upstream of the rocket propellant tank.

14. A launch vehicle comprising:
a rocket engine;
a rocket propellant tank associated with the rocket engine;
a valve to provide rocket propellant to the rocket propellant tank;
a supply line coupled to the valve and upstream of the rocket propellant tank;
a bleed line of the rocket engine coupled to the valve, the bleed line separate from the supply line and upstream of the rocket propellant tank;
a flow director to direct at least a portion of a flow of the rocket propellant toward the bleed line of the rocket engine to thermally condition the rocket engine while the rocket propellant tank is concurrently filled with the rocket propellant;
a propellant line between the rocket propellant tank and the bleed line, the propellant line to receive the rocket propellant from the rocket engine and to be angled from ground at an angle in a range from 35 to 55 degrees when the rocket propellant tank is upright relative thereto such that the angle of the propellant line facilitates filling of the rocket propellant tank from the rocket engine; and
a pre-valve between the flow director and the rocket propellant tank, the pre-valve to supply the rocket propellant from the flow director to the rocket propellant tank.

15. The launch vehicle as defined in claim 14, further including a bypass valve between the valve and the rocket propellant tank to vary a degree to which the rocket propellant flows to the bleed line.

16. The launch vehicle as defined in claim 15, further including a valve controller to vary a degree to which the bypass valve is opened based on an amount of the rocket propellant present within the rocket propellant tank.

17. The launch vehicle as defined in claim 14, further including a chill line between the rocket propellant tank and the valve.

18. The launch vehicle as defined in claim 17, further including a bypass branch that is in fluid communication with an exit of the chill line.

19. The launch vehicle as defined in claim 18, further including:
an overboard bleed valve at a first branch of a t-shaped juncture defined by the bypass branch; and
an inlet bypass valve of the rocket propellant tank at a second branch of the t-shaped juncture.

20. The launch vehicle as defined in claim 14, wherein the rocket propellant tank is part of a booster rocket of the launch vehicle.

21. The launch vehicle as defined in claim 14, wherein the flow director includes a plurality of valves, and further including a valve controller to coordinate opening and closing of the valves during a filling process of the rocket propellant tank.

22. An apparatus comprising:
- means for filling a rocket propellant tank with rocket propellant having means for concurrently providing the rocket propellant to a chill line of a rocket engine as the rocket propellant tank is filled, the means for filling a rocket propellant tank including a pre-valve at an inlet of the rocket propellant tank; and
- means for providing the rocket propellant to the rocket propellant tank from an outlet of an engine bleed line, wherein the means for providing the rocket propellant to the rocket propellant tank is angled from ground at an angle of approximately 35-55 degrees when the rocket propellant tank is upright relative thereto such that the angle of the means for providing the rocket propellant to the rocket propellant tank facilitates in the filling of the rocket propellant tank from the rocket engine.

23. The apparatus as defined in claim 22, further including means for detecting a fill level of the rocket propellant tank.

24. The apparatus as defined in claim 23, further including means for varying an opening of an inlet of the rocket propellant tank based on the fill level.

25. The apparatus as defined in claim 22, wherein the means for filling the rocket propellant tank and the means for thermally conditioning the rocket engine operate concurrently to enable quick launch readiness of the rocket engine.

* * * * *